US012229850B2

(12) United States Patent
He et al.

(10) Patent No.: US 12,229,850 B2
(45) Date of Patent: Feb. 18, 2025

(54) IMAGE PROCESSING DEVICE AND IMAGE PROCESSING METHOD

(71) Applicant: SigmaStar Technology Ltd., Fujian (CN)

(72) Inventors: Hu He, Shanghai (CN); Mingyong Sun, Shanghai (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 438 days.

(21) Appl. No.: 17/833,220

(22) Filed: Jun. 6, 2022

(65) Prior Publication Data

US 2023/0069030 A1   Mar. 2, 2023

(30) Foreign Application Priority Data

Aug. 26, 2021   (CN) .......................... 202110986892.7

(51) Int. Cl.
*G06T 5/20* (2006.01)
*G06T 1/20* (2006.01)
*G06T 1/60* (2006.01)

(52) U.S. Cl.
CPC ................ *G06T 1/20* (2013.01); *G06T 1/60* (2013.01); *G06T 5/20* (2013.01); *G06T 2207/20021* (2013.01)

(58) Field of Classification Search
CPC .... G06T 1/20; G06T 1/60; G06T 5/20; G06T 5/00; G06T 2207/20021; G06N 3/045; G06N 3/08
See application file for complete search history.

(56) References Cited

U.S. PATENT DOCUMENTS

2020/0105031 A1 *   4/2020   Cheng .................... G06N 3/084

FOREIGN PATENT DOCUMENTS

EP            3764651 A1 *   1/2021   .......... G06N 3/0454
KR       20200050433 A *   5/2020

* cited by examiner

*Primary Examiner* — Carol Wang
(74) *Attorney, Agent, or Firm* — Edell, Shapiro & Finnan, LLC

(57) ABSTRACT

An image processing device performs a filtering operation on image data according to a set of filter data, and includes a data reconstruction circuit, a memory and an intelligent processor. The data reconstruction circuit reconstructs data of blocks in the image data to generate first reconstruction data, and reconstructs the set of filter data to generate second reconstruction data. The memory stores the first reconstruction data and the second reconstruction data. The intelligent processor executes a depthwise convolution operation according to the first reconstruction data and the second reconstruction data to generate feature map data. Two adjacent of the multiple blocks have partially same data, and quantities of columns in the second reconstruction data are associated with a channel count of the depthwise convolution operation.

12 Claims, 7 Drawing Sheets

IMAGE PROCESSING DEVICE AND IMAGE PROCESSING METHOD

This application claims the benefit of China application Serial No. CN 202110986892.7, filed on Aug. 26, 2021, the subject matter of which is incorporated herein by reference.

BACKGROUND OF THE INVENTION

Field of the Invention

The invention relates to an image processing device, and more particularly, to an image processing device and an image processing method using reconstruction data to accelerate image processing.

Description of the Related Art

In the prior art, image filtering is implemented by huge amounts of multiplication operations and addition operations performed by a processor (or an image signal processor), with however the processor being capable of performing only one multiplication or addition operation in one single period. Thus, if the size of input image data or a filter mask is overly large, the processor then needs a considerable number of periods in order to complete image filtering, leading to reduced overall performance of image processing.

SUMMARY OF THE INVENTION

In some embodiments, an image processing device performs a filtering operation on image data according to a set of filter data, and includes a data reconstruction circuit, a memory and an intelligent processor. The data reconstruction circuit reconstructs data of multiple blocks in the image data to generate first reconstruction data, and reconstructs the set of filter data to generate second reconstruction data. The memory stores the first reconstruction data and the second reconstruction data. The intelligent processor executes a depthwise convolution operation according to the first reconstruction data and the second reconstruction data to generate feature map data. Two adjacent of the multiple blocks have partially same data, and quantities of columns in the second reconstruction data are associated with a channel count of the depthwise convolution operation.

In some embodiments, an image processing method is for performing a filtering process on image data according to a set of filter, and includes: reconstructing data of multiple blocks in the image data to generate first reconstruction data; reconstructing the set of the filter data to generate second reconstruction data; executing a depthwise convolution operation according to the first reconstruction data and the second reconstruction data by an intelligent processor to generate output image data. Two adjacent of the multiple blocks have partially same data, and quantities of columns in the second reconstruction data are associated with a channel count of the depthwise convolution operation.

The features, implementation details and effects of the present invention are described in the preferred embodiments with the accompanying drawings below.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope and meanings of the present invention. Similarly, the present invention is not limited to the embodiments enumerated in the description of the application.

The term "connected" or "coupled" used in the literature may refer to mutual, direct and physical or electrical contact, mutual, indirect physical or electrical contact, or mutual operations or behaviors of two or more elements. For example, the term "circuit" used in the description may be a device connected by at least one transistor and/or at least on active/passive elements in a certain connection means so as to process signals.

Figure 1:
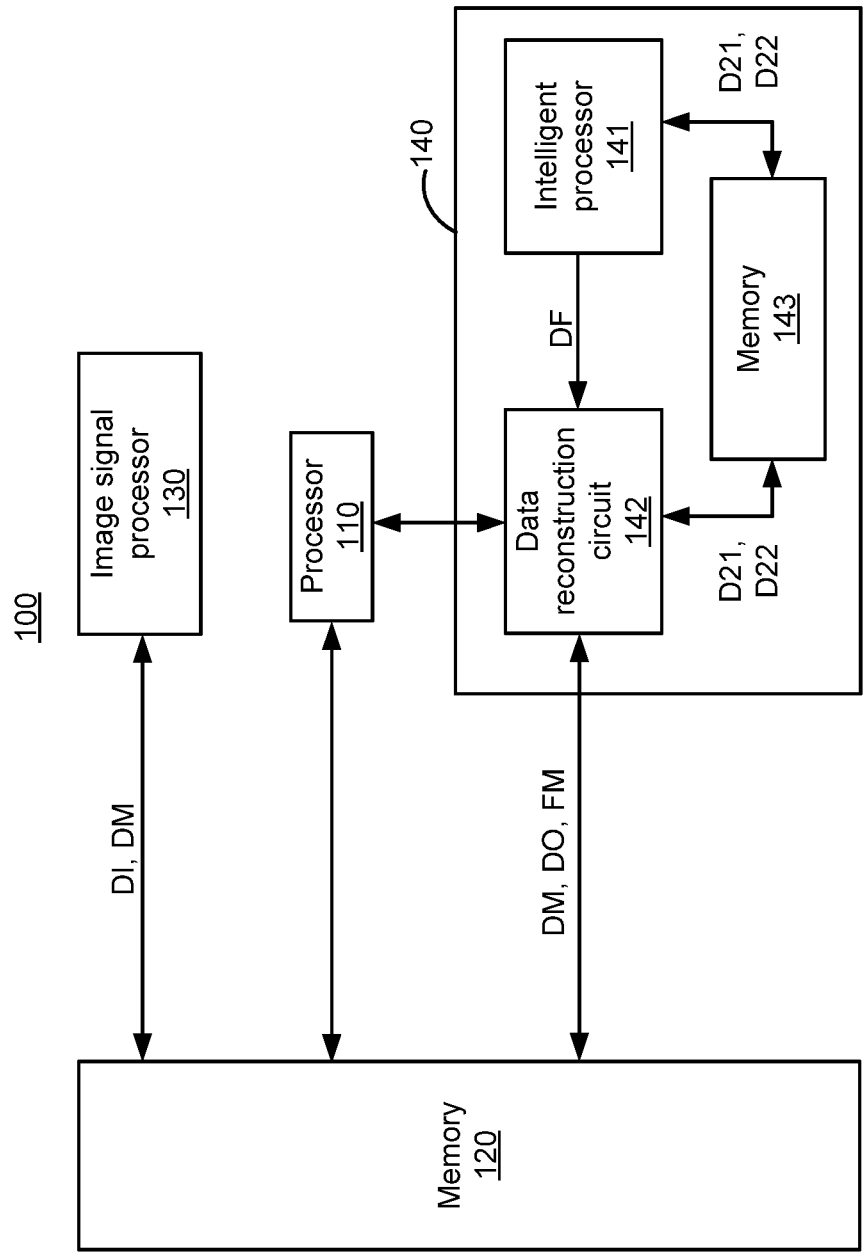
FIG. 1 is a schematic diagram of an image processing system according to some embodiments of the present invention.

FIG. 1 shows a schematic diagram of an image processing system 100 according to some embodiments of the present invention. The image processing system 100 includes a processor 110, a memory 120, an image signal processor 130 and an image processing device 140. In some embodiments, image processes performed or image processing methods supported in the image signal processor 130 and an intelligent processor 141 in the image processing device 140 are different. For example, the image signal processor 130 may perform image processing such as color processing, geometric conversion and image enhancement, and the intelligent processor 141 may perform image processing such as, for example but not limited to, image noise reduction and high Gaussian filtering. On the other hand, the image signal processor 130 may perform image processing in sequential manner, and the intelligent processor 14 may process image data in a parallel manner. For example, the image signal processor 130 performs image processing by executing one operation on one set of data of one pixel or one row after another in each period, and the intelligent processor 141 performs a filtering operation on image data by executing a parallel operation on multiple sets of data in each period. In some embodiments, the image processing device 140 may serve as an accelerator of the image signal processor 130, and may be used for accelerating execution efficiency of the filtering operation. In some embodiments, the image processing device 140 and the image signal processor 130 may be integrated into one single circuit system. In some embodiments, the image signal processor 130 performs image processing on input image data DI to generate image data DM, and the image processing device 140 then performs a filter operation on the image data DM.

The processor 110 may control the operations of the image signal processor 130 and/or the image processing device 140, and provide certain data and/or parameters (for example, information of multiple widths and heights to be described shortly) needed for the image processing of the image signal processor 130 and/or the image processing device 140. The memory 120 may store the input image data DI, the image data DM and the output image data DO for image processing performed by the image processor 130 and/or the image processing device 140. In some embodiments, the memory 120 may be a dynamic random access memory (DRAM).

The image processing device 140 includes an intelligent processor 141, a data reconstruction circuit 142 and a memory 143. The intelligent processor 141 may be implemented by an artificial intelligent circuit or a neural network circuit, so as to perform image filtering based on the image data DM to generate feature map data DF. For example, the intelligent processor 110 may execute a depthwise convolution operation based on the image data DM and a filter mask FM to accomplish image filtering of the image data, so as to generate the feature map data DF. In some embodiments, the filter mask FM is a mask in a matrix form and consists of a set of filter data, wherein the filter data includes filter coefficients/parameters corresponding to individual positions of the filter mask FM.

In some embodiments, the data reconstruction circuit 142 may be implemented by, for example but not limited to, a direct memory access (DMA) controller, and the memory 143 may be implemented by a static random access memory (SRAM). The data reconstruction circuit 142 may reconstruct data of multiple blocks in the image data DM into reconstruction data D21, and reconstruct data of the filter mask FM into reconstruction data D22. In the depthwise convolution operation, each convolutional kernel corresponds to one channel, and each channel performs the convention operation independently. Thus, with the data reconstruction circuit 142, the image data DM and the filter mask FM can be converted to data formats suitable for parallel processing. In this example, the data reconstruction circuit 142 converts the image data DM and the filter mask FM into data formats needed for performing the depthwise convolution operation. As such, the intelligent processor 141 can process the reconstruction data D21 and the reconstruction data D22 in parallel using multiple channels, so as to more efficiently execute the depthwise convolution operation and achieve the filter operation by the intelligent processor 141.

The data reconstruction circuit 142 further arranges the feature map data DF into the output image data DO (that is, image data having undergone a filtering operation), and stores the output image data DO in the memory 120. The memory 143 may store the reconstruction data D21, the reconstruction data D22 and the feature map data DF generated during the data reconstruction process above. Operation details of the data reconstruction circuit 142 are to be described shortly.

Figure 2:
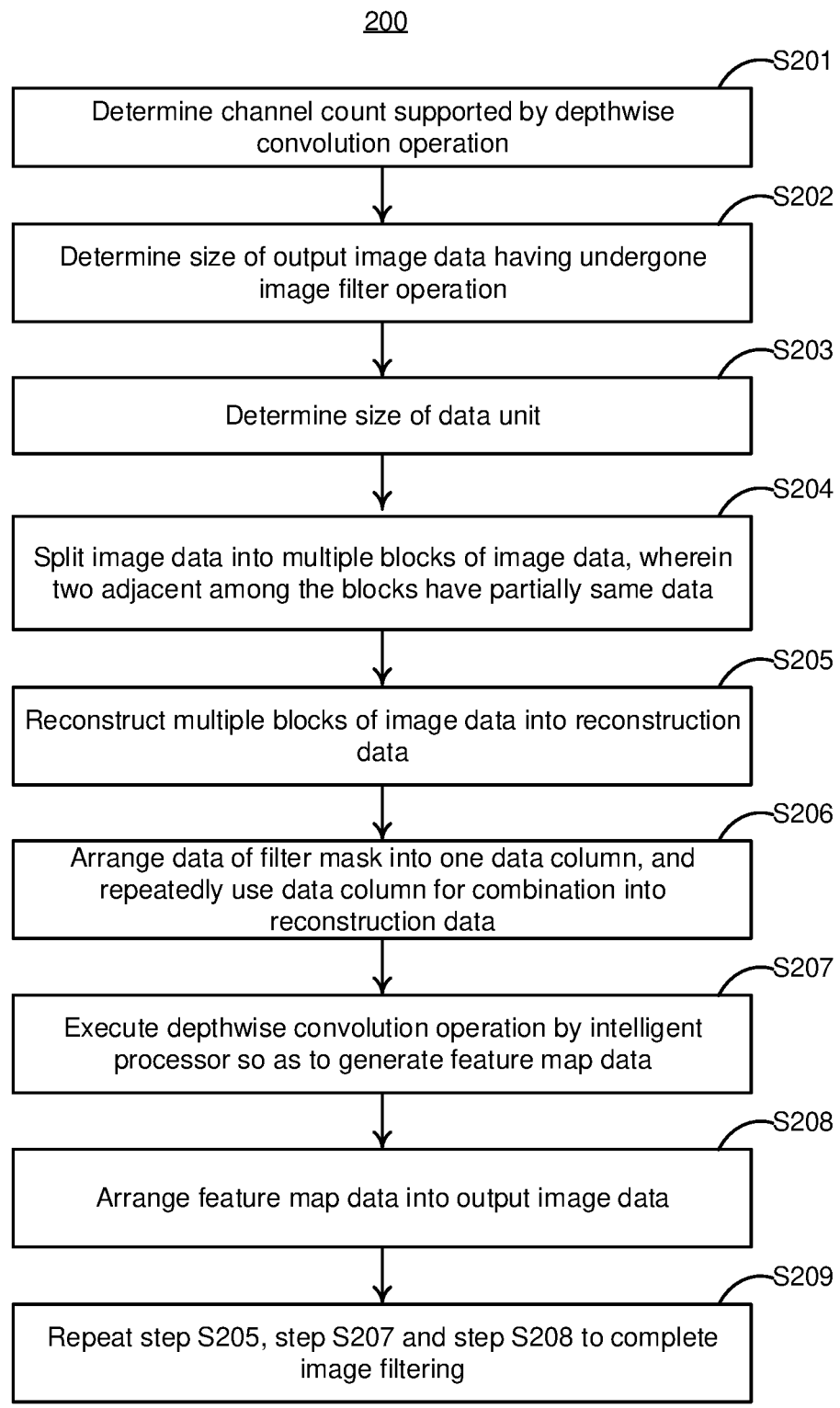
FIG. 2 is a flowchart of an image processing method according to some embodiments of the present invention.

FIG. 2 shows a flowchart of an image processing method 200 according to some embodiments of the present invention. In some embodiments, the image processing method 200 may be performed by the image processing system 100 in FIG. 1. For better illustration, associated operation details of the image processing system 100 are to be described with reference to FIG. 2.

In step S201, the number of channels (channel count) supported by a depthwise convolution operation executed by an intelligent processor is determined. For example, with settings beforehand, the processor 110 may obtain related specifications, models operated and/or related parameters of the intelligent processor 141, so as to further acquire or set the number of channels (to be referred to as a channel count C below) of the depthwise convolution operation.

In step S202, a size of output image data (for example, the output image data DO) processed by image filtering is determined. In step S203, a size of unit data is determined.

Figure 3A:
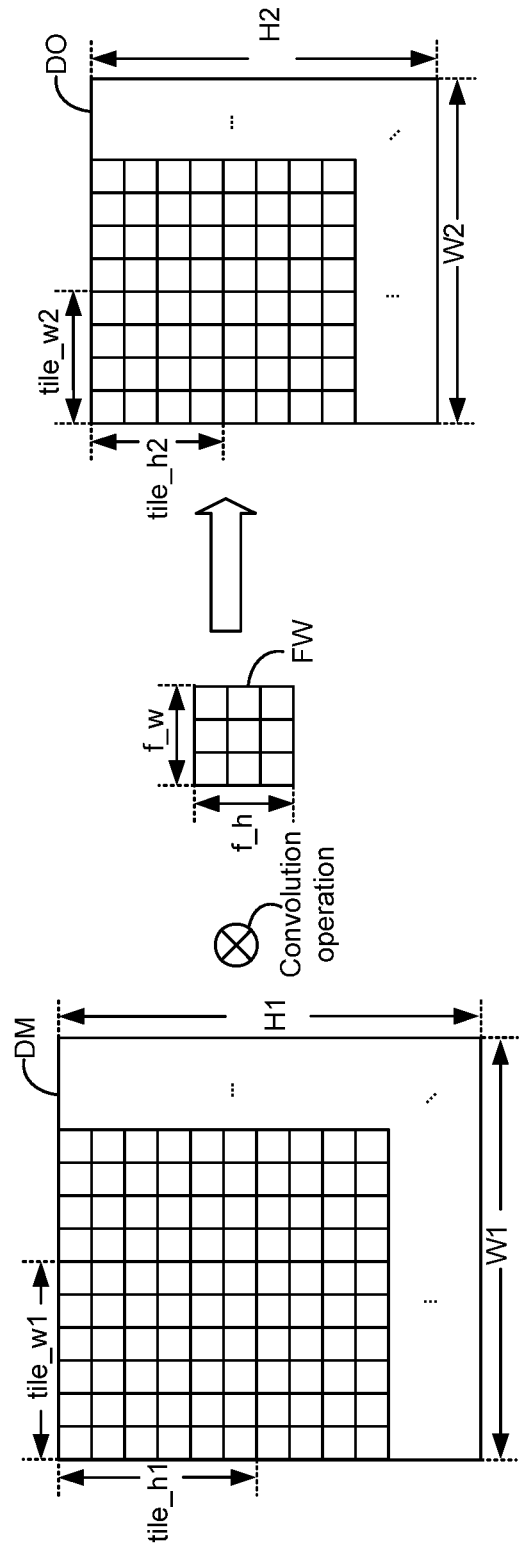
FIG. 3A is a schematic diagram of image data, a filter mask and output image data in FIG. 1 according to some embodiments of the present invention.

Refer to FIG. 3A for description associated with step S202 and step S203. FIG. 3A shows a schematic diagram of the image data DM, the filter mask FM and the output image data DO in FIG. 1 according to some embodiments of the present invention. In this example, the image data DM has a width of W1 and a height of H1. The filter mask FM is a mask having a width of f_w and a height of f_h. In the filtering operation, multiplication-addition is performed by means of moving the filter mask FM sequentially on the image data. Assuming that a movement amount of the filter mask FM each time is one pixel, the processor 110 may determine a width D2 and a height H2 of the output image data DO according to the equations below:

$$W2 = W1 - f\_w + 1$$

$$H2 = H1 - f\_h + 1$$

For example, the width W1 and the height H1 are both 1000 (in a unit of pixels), and the width f_w and the height f_h are both 9. Based on the equations above, it can be deduced that the width W2 and the height H2 are both 992.

Next, the processor 110 may simulate multiple splitting modes to be performed on the output image data DO so as to identify appropriate width tile_w2 and height tile_h2 per unit data. In some embodiments, the width tile_w and the height tile_h2 satisfy two conditions. One of the conditions is that a total data amount generated by the reconstruction performed by the data reconstruction circuit 142 does not exceed the capacity of the memory 143, and may be expressed as an equation below:

$$tile\_w1 \times tile\_h1 \times C + f\_h \times f\_w \times C + tile\_w2 \times tile\_h2 \times C < MS$$

In the above C is the channel count, tile_w1 and tile_h1 are respectively the width and the height of the blocks of image data, and the MS is the capacity of the memory 143.

The second condition is that it is guaranteed that the intelligent processor 141 processes the reconstruction data D21 in a most efficient manner, and this condition may be expressed to minimize a calculation result of the equation below:

$$tile\_w1 \times tile\_h1 \times C \times n$$

In the equation above, n represents the number of times of operations needed when the intelligent processor 141 performs image filtering. In some embodiments, the processor 110 may determine possible value ranges of the width tile_w2 and the height tile_h2 according to the first condition, and then calculate possible value ranges of the width tile_w1, the height tile_h1 and the number of times n by means of integer programming. Thus, the processor 110 may use the possible value ranges of the parameters above and the second condition to execute a trial-and-error method (or other appropriate algorithms), so as to identify appropriate values for the width tile_w1, the height_h1, the width tile_w2, the height tile_h2 and the number of times n.

In some embodiments, the operation for calculating the width tile_w1, the height tile_h1 and the number of times n may be expressed as the equations below, where the function ceil( ) is a round-up function:

$$tile\_w1 = tile\_w2 - 1 + f\_w$$

$$tile\_h1 = tile\_h2 - 1 + f\_h$$

$$n = ceil\left(\frac{ceil\left(\frac{W2}{tile\_w2}\right) \times ceil\left(\frac{h2}{tile\_h2}\right)}{C}\right)$$

In the example in FIG. 3A, the width tile_w1 and the height tile_h1 are both 6, and the width tile_w2 and the height tile_h2 are both 4. The values of the parameters above are merely examples used for illustration purposes, and the present invention is not limited to these exemplary values above. In some embodiments, the parameters may be stored in advance in a buffer, and the processor 110 may read the buffer so as to obtain these parameters.

Again referring to FIG. 2, in step S204, the image data is split into multiple blocks of image data, wherein two adjacent among the multiple blocks have partially same data. In step S205, data of the multiple blocks is reconstructed into reconstruction data (for example, the reconstruction data D21).

Figure 3B:
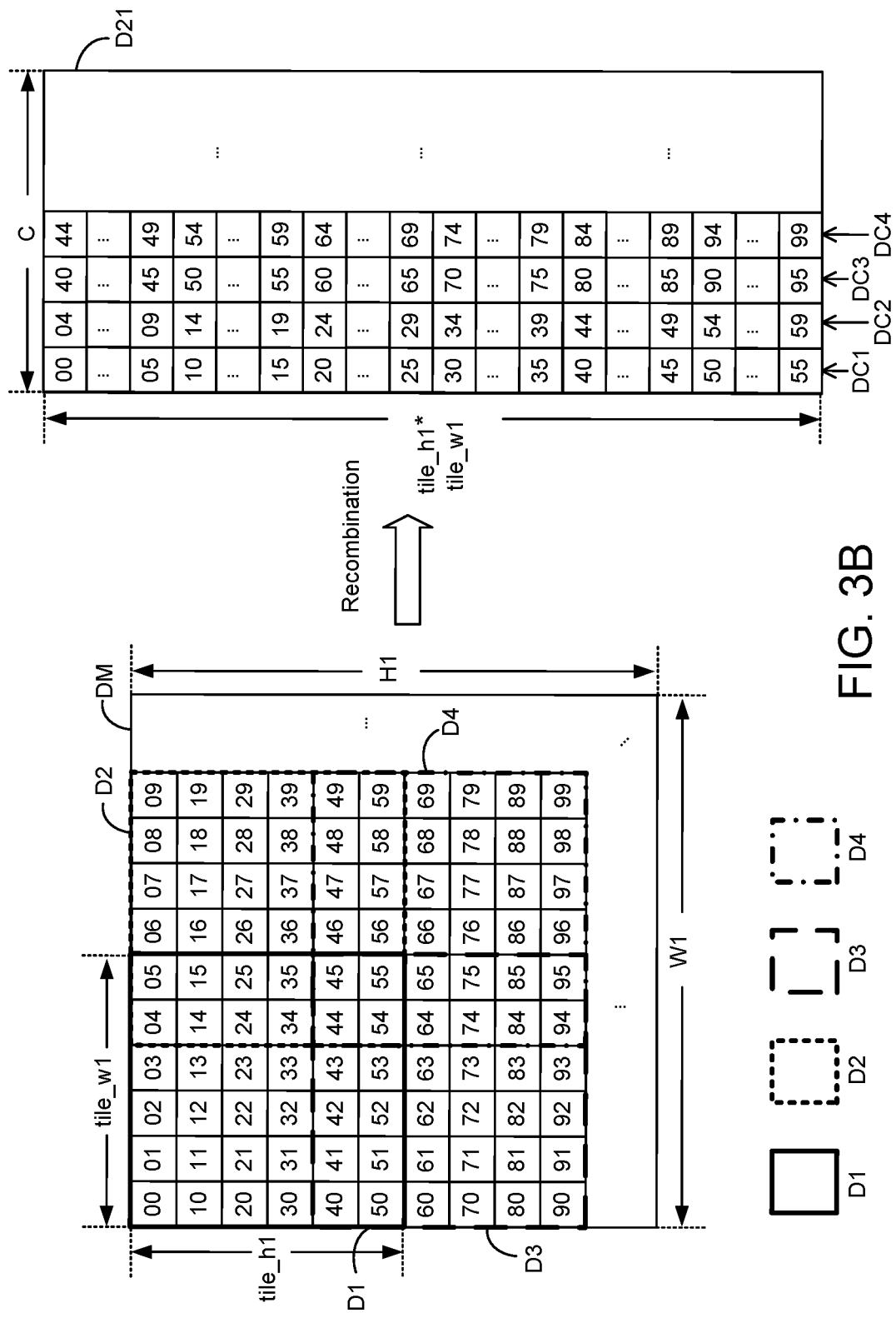
FIG. 3B is a schematic diagram of reconstructing the image data in FIG. 1 into reconstruction data according to some embodiments of the present invention.

Refer to FIG. 3B for description associated with step S204 and step S205. FIG. 3B shows a schematic diagram of reconstructing the image data DM in FIG. 1 into the reconstruction D21 according to some embodiments of the present invention. As described above, information of the width tile_w1 and the height tile_h1 can be obtained through steps S201 to S203. As such, the processor 110 may sequentially split the image data DM according to the width tile_w1 and the height tile_h1 into multiple blocks of image data, wherein the width and the height of each block of image data are the width tile_w1 and the height tile_h1, respectively.

For better understanding, FIG. 3B depicts only four blocks of image data D1 to D4. The image data DM includes K pixel values 00, 01, . . . and K (not shown in FIG. 3B). The block of image data D1 includes multiple pixel values 00 to 05, 10 to 15, 20 to 25, 30 to 35, 40 to 45 and 50 to 55. The block of image data D2 includes multiple pixels values 04 to 09, 14 to 19, 24 to 29, 34 to 39, 44 to 49 and 54 to 59. The block of image data D3 includes multiple pixel values 40 to 45, 50 to 55, 60 to 65, 70 to 75, 80 to 85 and 90 to 95. The block of image data D4 includes multiple pixel values 44 to 49, 54 to 59, 64 to 69, 74 to 79, 84 to 89 and 94 to 99. Since image filtering is performed according to multiple adjacent pixel values within a certain area (for example, the filter mask FM), two adjacent among the multiple blocks of image data D1 to D4 are partially overlapping and have partially the same data in order to satisfy requirements of image filtering. In this example, from two adjacent among the multiple blocks of image data D1 to D4, data of (f_h-1) rows of is overlapping in the vertical direction, and data of (f_w-1) columns is overlapping in the horizontal direction. For example, data of two rightmost columns (that is, the pixel values 04, 05, 14, 15, 24, 25, 34, 35, 44, 45, 54 and 55) of the block of image data D1 are the same as data of two leftmost columns of the block of image data D2; data of two bottom rows of the block of image data D1 (that is, the pixel values 40 to 45 and 50 to 55) are the same as data of two top rows of the block of image data D3.

Next, the data reconstruction circuit 142 may reconstruct data of the multiple blocks into reconstruction data D21. For example, the multiple blocks of image data D1 to D4 are sequentially arranged into multiples columns of data (column data) DC1 to DC4 of the reconstruction data D21. In other words, multiple pixel values in the column data DC1 are the same as multiple pixel values of the block of image data D1, and these pixel values are reconstructed into one single data column. Similarly, the data reconstruction circuit 142 may reconstruct data of the multiple blocks into reconstruction data D21 have multiple columns and multiple rows, and store the reconstruction data D21 to the memory 143. In some embodiments, the reconstruction data D21 is stored in a two-dimensional arrangement in the memory 143, as shown in FIG. 3B. In some embodiments, the number of columns of the reconstruction data D21 is determined by the foregoing channel count C, and the number of rows of the reconstruction data D21 is a product of the width tile_w1 and the height tile_h1 (that is, tile_w1*tile_h1). For example, the number of columns of the reconstruction data D21 is the same as the channel count C, allowing the intelligent processor 141 to thoroughly utilize all the channels of the depthwise convolution operation when performing one round of the depthwise convolution operation.

Again referring to FIG. 2, in step S206, data of the filter mask is arranged into one data column, and reconstruction data (for example, the reconstruction data D22) is formed by repeatedly using this data column.

Figure 3C:
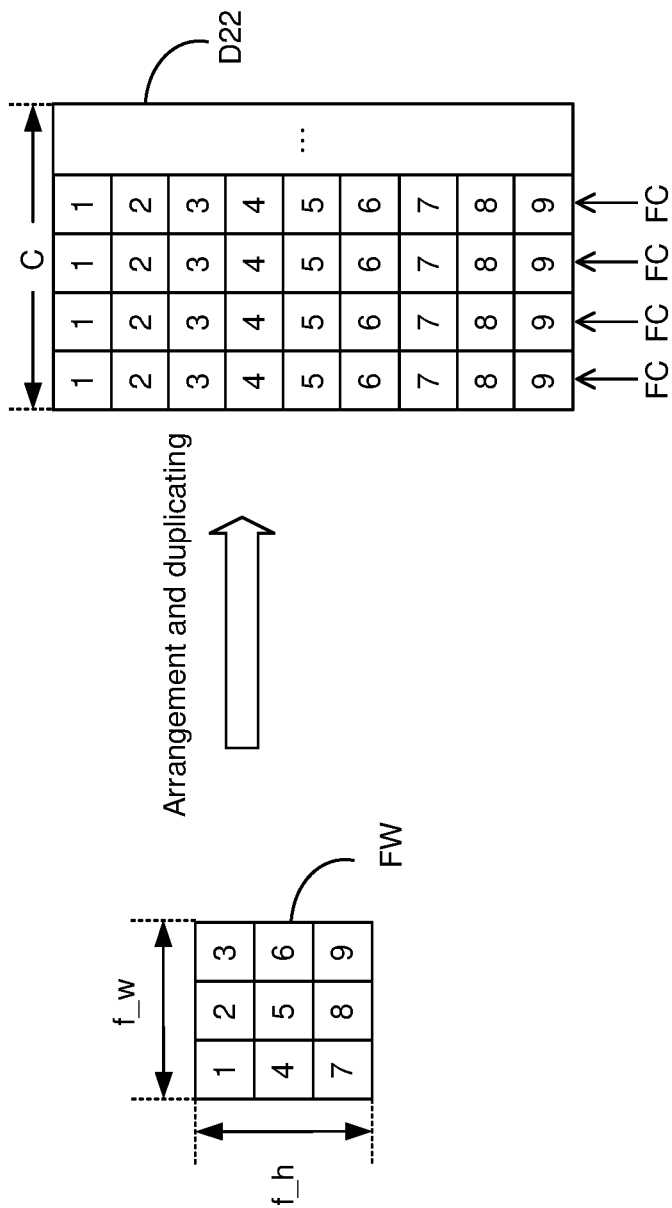
FIG. 3C is a schematic diagram of generating reconstruction data by means of a filter mask in FIG. 1 according to some embodiments of the present invention.

Refer to FIG. 3C for details on step S206. FIG. 3C shows a schematic diagram of generating the reconstruction data D22 according to the filter mask FM in FIG. 1 according to some embodiments of the present invention. In this example, the filter mask FM is a mask having nine element values 1 to 9. The reconstruction circuit 142 may arrange the multiple element values 1 to 9 in the filter mask FM into one data column C. Then, the data reconstruction circuit 142 may repeatedly duplicate the data column FC to generate multiple data columns FC, combine these data columns FC into the reconstruction data D22, and store the reconstruction data D22 to the memory 143. In some embodiments, the reconstruction data D22 is stored in a two-dimensional arrangement in the memory 143. In some embodiments, the number of columns of the reconstruction data D22 corresponds to the number of columns of the reconstruction data D21, and the number of columns of the reconstruction data D22 and the number of columns of the reconstruction data D21 may both be determined based on the foregoing channel count C. For example, the number of columns of the reconstruction data D22 is equal to the channel count C.

Again referring to FIG. 2, in step S207, a depthwise convolution operation is executed by the intelligent processor according to the multiple sets of reconstruction data to generate feature map data.

Figure 3D:
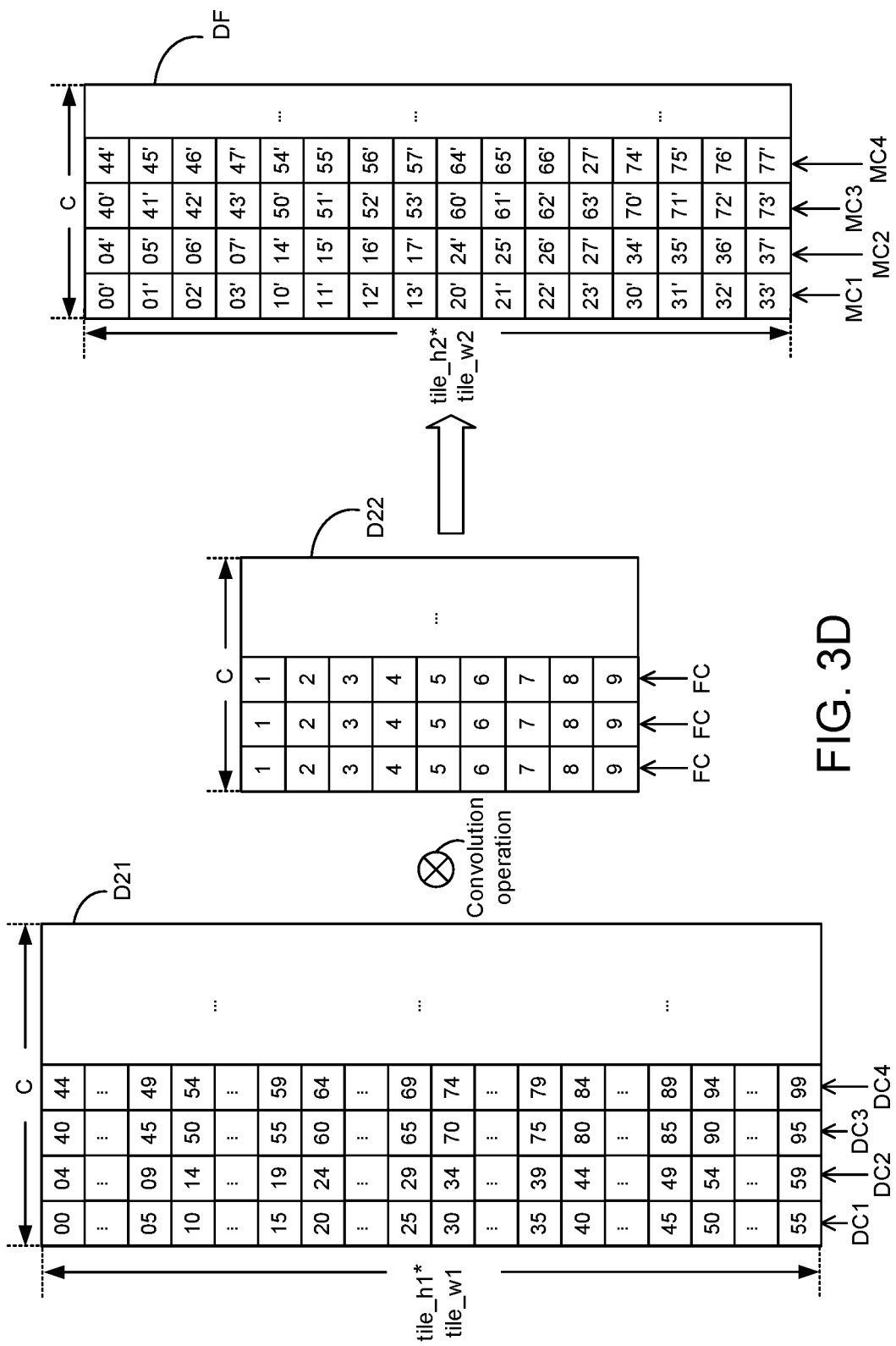
FIG. 3D is a schematic diagram of generating feature map data according to multiple sets of reconstruction data in FIG. 1 according to some embodiments of the present invention.

Refer to FIG. 3D for details on step S207. FIG. 3D shows a schematic diagram of generating the feature map data DF according to the reconstruction data D21 and the reconstruction data D22 in FIG. 1 according to some embodiments of the present invention. The intelligent processor 141 may process the reconstruction data D21 and the reconstruction data D22 in parallel so as to execute a depthwise convolution operation. For example, corresponding to each channel of the depthwise convolution operation, the intelligent processor 141 may read one corresponding data column of the reconstruction data D21 and one corresponding data column of the reconstruction data D22 to execute the convolution operation, so as to generate one corresponding data column of the feature map data DF. For example, corresponding to the first channel of the depthwise convolution operation, the intelligent processor 141 may execute the convolution operation on the first data column DC1 of the reconstruction data D21 and the first data column FC of the reconstruction data D21 to generate a data column MC1. Corresponding to the second channel of the depthwise convolution operation, the intelligent processor 141 may execute the convolution operation on the second data column DC2 of the reconstruction data D21 and the second data column FC of the reconstruction data D22 to generate a data column MC2. Similarly, it can be understood that the intelligent processor 141 is capable of executing multiple convolution operations in parallel within one period. Thus, the intelligent processor 141 can more efficiently execute image filtering to generate the feature map data DF and store the feature map data DF to the memory 143. As shown in FIG. 3D, the number of rows of the feature map data DF is a product of the width tile_w2 and the height tile_h2, and the number of columns of the feature map data DF is equal to the channel count C.

Figure 3E:
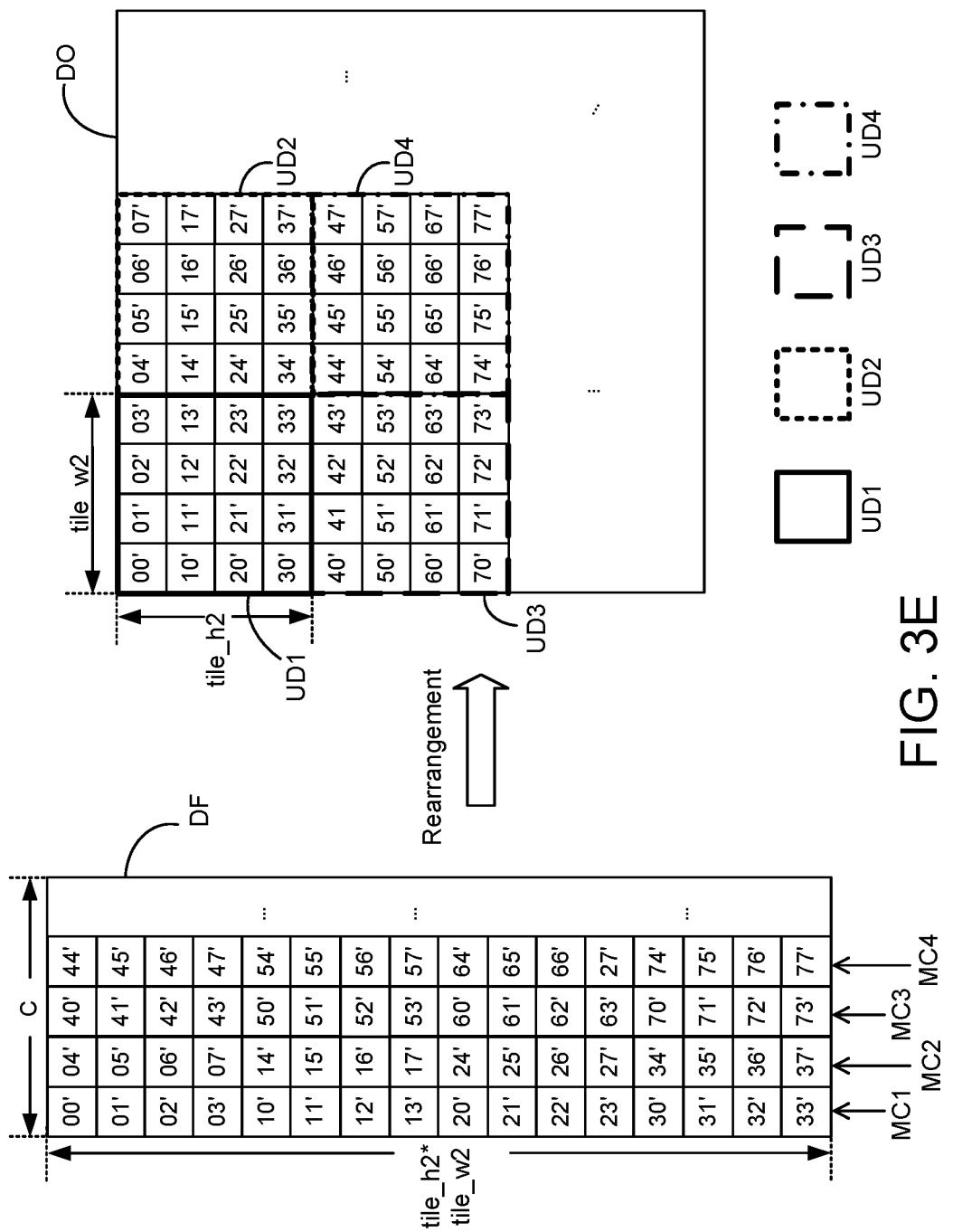
FIG. 3E is a schematic diagram of arranging the feature map data in FIG. 1 into output image data according to some embodiments of the present invention.

Again referring to FIG. 2, in step S208, the feature map data is arranged into output image data. Refer to FIG. 3E for details on step S208. FIG. 3E shows a schematic diagram of arranging the feature map data DF in FIG. 1 into the output image data DO according to some embodiments of the present invention. The data reconstruction circuit 142 rearranges the multiple data columns (for example, data columns MC1 to MC4) of the feature map data according to the width tile_w2 and the height tile_h2 into multiple sets of unit data (for example, the unit data UD1 to UD4), and combines the unit data into the output image data DO that is then stored to the memory 120. Thus, the image signal processor 130 can continue subsequent processing or use the output image data DO.

Specifically, the data column MC1 includes multiple pixel values 00' to 03', 10' to 13', 20' to 23' and 30' to 33'. The data reconstruction circuit 142 can arrange the multiple pixel values 00' to 03', 10' to 13', 20' to 23' and 30' to 33' according to an image format of the width tile_w2 and the height tile_h2, so as to generate the unit data UD1. The data column MC2 includes multiple pixel values 04' to 07', 14' to 17', 24' to 27' and 34' to 37'. The data reconstruction circuit 142 can arrange the multiple pixel values 04' to 07', 14' to 17', 24' to 27' and 34' to 37' according to an image format of the width tile_w2 and the height tile_h2, so as to generate the unit data UD2. Similarly, the correspondence between multiple pixel values 40' to 43', 50' to 53', 60' to 63' and 70' to 73' of the data column MC3 and the unit data UD3, and the correspondence between multiple pixel values 44' to 47', 54' to 57', 64' to 67' and 74' to 77' of the data column MC4 and the unit data UD4 can be accordingly deduced. Based on FIG. 3E, it is known that in some embodiments, the reconstruction performed by the data reconstruction circuit 142 on the feature map data DF corresponds to the reconstruction performed by the data reconstruction circuit 142 on the multiple blocks of image data D1 to D4.

Again referring to FIG. 2, in step S209, step S205, step S207 and step S208 are repeated so as to complete image filtering. For example, the data reconstruction 142 and the intelligent processor 141 may repeatedly perform step S205, step S207 and step S208 (for example, for n times), until the image data DM is completely split and combined into the complete output image data DO.

The multiple steps of the image processing method 200 are only examples and are not necessarily performed according to the order described in the example. Without departing from the operation details and scope of the various embodiments of the present invention, various steps may be added, replaced, omitted or performed in different orders (for example, simultaneously performed or partially simultaneously performed) with respect to the image processing method.

In conclusion, the image processing device and the image processing method according to some embodiments of the present invention are capable of generating by means of data reconstruction an image data format suitable for parallel operations. Moreover, the image processing system concurrently includes the image signal processor and the intelligent processor, so that image processing suitable for sequential operations may be performed by the image signal processing, and image processing suitable for parallel operations may be performed by the intelligent processor. Thus, a processing speed of image processing (for example, image filtering) of the intelligent processor is fully utilized to improve the overall performance of the image processing system.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. An image processing device, for performing a filtering operation on image data according to a set of filter data, the device comprising:
   a data reconstruction circuit, reconstructing data of a plurality of blocks in the image data to generate first reconstruction data, and reconstructing the set of filter data to generate second reconstruction data;
   a memory, storing the first reconstruction data and the second reconstruction data; and
   an intelligent processor, executing a depthwise convolution operation according to the first reconstruction data and the second reconstruction data to generate feature map data;
   wherein, two adjacent among the blocks have partially same data, and quantities of columns of the second reconstruction data are associated with a channel count of the depthwise convolution operation.

2. The image processing device according to claim 1, wherein the data reconstruction circuit arranges data of each of the blocks into one data column of the first reconstruction data.

3. The image processing device according to claim 1, wherein the data reconstruction circuit arranges the set of filter data into one data column, and repeatedly uses the data column so as to generate the second reconstruction data.

4. The image processing device according to claim 3, wherein the quantities of columns of the second reconstruction data are equal to the channel count of the depthwise convolutional operation.

5. The image processing device according to claim 1, further comprising:
   an image signal processor, performing image processing on input image data to generate the image data;
   wherein, the image signal processor performs image processing on the input image data in a sequential manner, and the intelligent processor executes the depthwise convolution operation in a parallel manner.

6. The image processing device according to claim 1, wherein the data reconstruction circuit reconstructs the feature map data to generate output image data, and reconstruction performed by the data reconstruction circuit on the feature map data corresponds to reconstruction performed by the data reconstruction circuit on the data of the blocks.

7. The image processing device according to claim 1, wherein a size of the blocks is determined according to a capacity of the memory and the channel count.

8. An image processing method, for performing a filtering operation on image data according to a set of filter data, the method comprising:
   reconstructing data of a plurality of blocks in the image data to generate first reconstruction data;
   reconstructing the set of filter data to generate second reconstruction data;
   executing a depthwise convolution operation by an intelligent processor according to the first reconstruction data and the second reconstruction data to generate feature map data; and
   reconstructing the feature map data to generate output image data;
   wherein, two adjacent among the blocks have partially same data, and quantities of columns of the second reconstruction data is associated with a channel count of the depthwise convolution operation.

9. The image processing method according to claim 8, wherein the reconstructing of the set of filter data to generate the second reconstruction data comprises:
   arranging the set of filter data into one data column, and repeatedly using the data column to generate the second reconstruction data.

10. The image processing method according to claim 9, wherein the quantities of columns of the second reconstruction data are equal to the channel count of the depthwise convolution operation.

11. The image processing method according to claim 8, further comprising:
   performing image processing on input image data by an image signal processor to generate the image data;
   wherein, the image signal processor performs image processing on the input image data in a sequential manner, and the intelligent processor executes the depthwise convolution operation in a parallel manner.

12. The image processing method according to claim 8, further comprising:
   storing the first reconstruction data and the second reconstruction data to a memory;
   wherein, a size of the blocks is determined according to a capacity of the memory and the channel count.

* * * * *